Aug. 26, 1969  L. R. CRUZ  3,463,417
DIRECTIONAL CONTROL MEANS FOR HIGH TURBULENCE AND
VELOCITY OF FLUID FLOW OVER AN AIRFOIL ASSEMBLY
Filed June 8, 1967
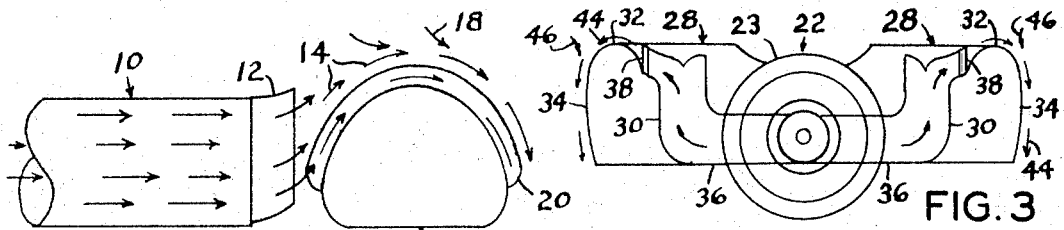
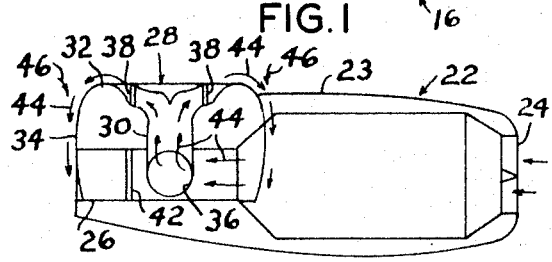
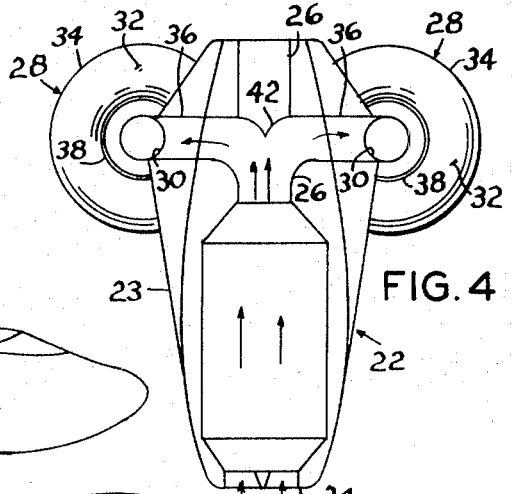
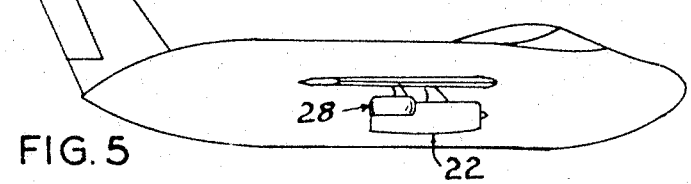
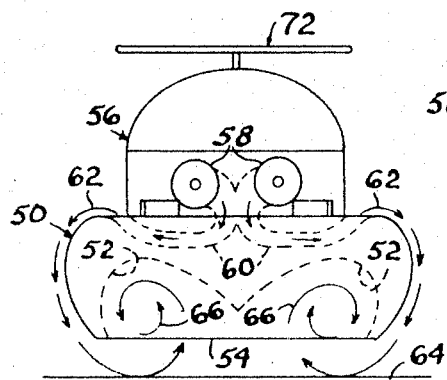
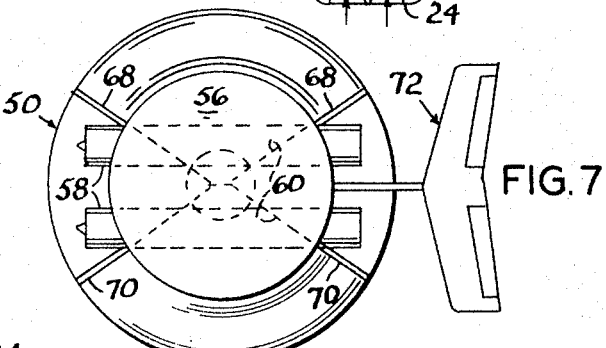
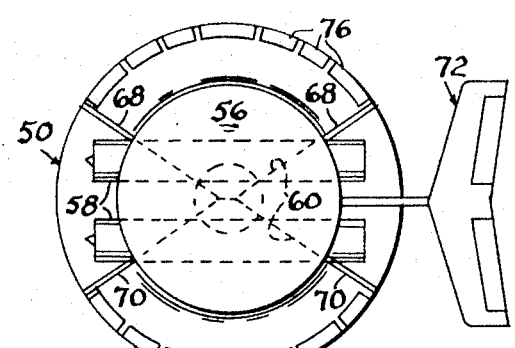
INVENTOR.
LUIS ROBERTO CRUZ
BY
Robert K. Rhea
AGENT United States Patent Office 3,463,417
Patented Aug. 26, 1969

3,463,417
DIRECTIONAL CONTROL MEANS FOR HIGH TURBULENCE AND VELOCITY OF FLUID FLOW OVER AN AIRFOIL ASSEMBLY
Luis Roberto Cruz, 2817 S. Dewey, Apt. C–10, Norman, Okla. 73069
Filed June 8, 1967, Ser. No. 644,622
Int. Cl. B64c *29/00, 15/06;* B64d *27/18*
U.S. Cl. 244—23
3 Claims

ABSTRACT OF THE DISCLOSURE

In an aircraft a substantially circular airfoil having an upper arcuate surface merging with a depending substantially semi-elliptical outer wall is connected with or positioned adjacent means providing a stream of heated fluid. Conduit means communicating with the stream of heated fluid directs the latter outwardly over the airfoil surfaces for generating a vertical thrust.

Background of the invention

It is well understood by those skilled in the art that fluid flow along a structural surface adheres to the surface so that its velocity at the surface is zero and such that the velocity generally increases toward a finite value outside the boundary layer in a direction transverse to the layer. There are two types of flow defined as laminar flow and turbulent flow. In the laminar type flow a smooth gliding current exists wherein smoke or dye injected into the fluid stream flows down stream in regular stream lines. Turbulent type flow, on the other hand, is characterized by random particle movement such that the stream lines of the flow are irregular and cannot be defined when smoke or a dye is injected into the stream. A fluid flow can be maintained along a smooth polished surface if the velocity of the flow continuously increases in the direction of the flow. Transition to a turbulent state occurs in a rapidly decreasing flow velocity which results in a separation of the stream from the surface. Airfoil drag and lift characteristics vary and depend upon the nature of the flow thereover. A nonseparating laminar flow along an airfoil surface normally provides minimum drag and maximum lift under certain desirable conditions. Such a condition is achieved by a blowing type device wherein the flow is constantly accelerated down stream.

Tests made in a wind tunnel with an airfoil show that a degree of turbulence of a wind stream affects the $C_{L_{max}}$ and $C_D$ where $C_{L_{max}}$ is the maximum lift coefficient of the wing and $C_D$ is the drag coefficient of the wing. Curves plotted for a 5.89 inch diameter cylinder show the characteristic changes in pressure distribution which occurs in the critical range of Reynold's number $$(10^5 < R < 2.5 \times 10^5)$$

The coefficient of minimum pressure falls steadily and the point at which it occurs moves further around the cylinder as R increases, while the pressure coefficient at the back of the cylinder rises. The coefficient or minimum pressure decreases to a smaller value when the cylinder is mounted in a disturbed stream behind a rope netting. Also the marked inflection of each curve, just beyond the region of minimum pressure, moves further around the cylinder as R increases and even more so as the degree of turbulence increases. The inflection in each pressure curve occurs where the frictional intensity is minimum. The curves in intensity of skin friction on a cylinder, where R equals $1.66 \times 10^5$, show that the addition of an artificial turbulence in the wind tunnel stream produces a rearward movement of the position of the minimum frictional intensity. The maximum lift coefficient of a section of airfoil depends not only on its shape and the Reynold's number but also on the turbulence in the free stream. This is clearly shown by curves where $C_{L_{max}}$ is plotted against R for airfoils tested behind turbulence screens. The curves show that $C_{L_{max}}$ increases as the degree of turbulence increases. The tendency is for $C_{L_{max}}$ to increase with R and with turbulence. (Reference, Modern Developement of Fluid Dynamics, by S. Goldstein, volume 2, 1965, FIGURES 152; 157; 169 and 170.)

Summary of the invention

A substantially circular airfoil having a substantially semi-elliptical surrounding wall is positioned rearward and laterally of a jet engine for communication with the heated gases exhaust duct so that the heated gases may be deflected laterally and upward within the central portion of the airfoil to flow outwardly and downwardly around the semi-elliptical wall. These lift forces, developed by the flow of heated gases over the airfoil, permit vertical take-off and landing of a jet engine equipped aircraft.

The principal object of the invention is to provide an airfoil assembly communicating with the exhaust gases of a jet engine to utilize the force generated by the stream of heated gases over the airfoil as a lifting force for an aircraft in vertical take-off and landing actions.

Brief description of the drawings

FIGURE 1 is a diagrammatic view illustrating the principle of lift forces developed by a flow of heated gases over an airfoil;

FIGURE 2 is a diagrammatic side view of a jet engine having substantially circular semi-elliptical walled airfoils connected with the exhaust duct of the jet engine;

FIGURE 3 is a front elevational view of FIG. 2;

FIGURE 4 is a top plan view of FIG. 3;

FIGURE 5 is a side elevational view of an aircraft having the device installed thereon;

FIGURE 6 is a diagrammatic front elevational view of the device applied to another type of aircraft;

FIGURE 7 is a top plan view of FIG. 6;

FIGURE 8 is a front elevational view similar to FIG. 6 of an alternative embodiment; and, FIGURE 9 is a top plan view of FIG. 8.

Description of the preferred embodiments

Like characters of reference designate like parts in those figures of the drawings in which they occur.

In the drawings:

The reference numeral 10 indicates a duct containing a stream of high velocity fluid or gas emitting from a discharge nozzle 12 which may contain fixed or variable guide plates. The guide 12 directs the stream of heated gases, indicated by the arrows 14, toward a circular or elliptical wall airfoil 16. As the mass of gases 14 is deflected over the airfoil ambient air, indicated by the arrows 18, mixes with it. The velocity of the mass of heated gases is accelerated over the airfoil and its acceleration is increased by the ambient air. This results in a strong lifting force applied to the airfoil 16. An upstanding wall forming a guide fence 20 is positioned transversely of the airfoil at its respective ends to prevent the spreading of the stream 14 transversely of its direction of travel.

Referring now more particularly to FIGS. 2, 3 and 4, the numeral 22 indicates a conventional jet engine having a housing 23, air intake end 24 and an exhaust duct 26. A substantially circular airfoil 28 is attached to the respective opposing lateral sides of the rearward portion of the jet engine housing. Each airfoil 28 is characterized by an upper arcuate surface 32 and an outer depending substantially semi-elliptical wall 34 with the major axis of the semi-elliptical surface disposed substantially vertical. Each airfoil is provided with a central duct or conduit 30 forming a distribution chamber and having lateral substantially horizontal extensions 36 communicating with the engine exhaust duct 26. A deflector 42, positioned within the engine exhaust 26 rearwardly of its connection with the airfoil ducts 30, selectively deflects the heated exhaust gases, indicated by the arrows 44, into the duct 30. Nozzles 38, connected with and defining the upper exit end of the conduit 30, direct the heated gases, indicated by the arrows 44, so that they flow outwardly over the outer surfaces 32 and 34 of the airfoil. Obviously the lateral and upwardly directed airfoil ducts 30 may be provided with vortex or turbulence generators, not shown, to increase the velocity of the gases 44. The mass of gases 44 mixes with ambient air, indicated by the arrows 46. This develops an aerodynamic force for lifting an airplane in landing and take-off operations. In level flight the deflector 42 is positioned to permit exhaust gases to pass rearwardly out of the engine exhaust 26.

Referring now to FIGS. 6 and 7, the numeral 50 indicates a substantially circular airfoil similarly formed externally with respect to the airfoil 28 but having convex inner surfaces 52 extending upwardly above its lower limit 54 and opening downwardly for the purposes presently explained.

A circular dome topped engine support and control housing 56 is centrally positioned over the airfoil 50. Conventional jet engines 58 are positioned in parallel spaced relation within the housing 56. Similarly laterally extending gas conduits or ducts 60 in communication with the respective engine exhaust duct directs heated gases, indicated by the arrows 62, outwardly over the surfaces of the airfoil 50 in the manner described hereinabove.

These gases 62, passing over the sides of the airfoil 50, impinge on the supporting surface indicated by the line 64. As the aircraft is initially lifted off the support surface the stream of gases is deflected inwardly and upwardly by the surface 64 toward the convex surfaces 52, in the manner shown by the arrows 66. This generates a vortex flow of the mass of gases, between the convex surfaces 52 and the support surface 64, so that a second lift, generated by the vortex flow of the gases 66, supplements the lift force applied to the aircraft. Opposing laterally diverging pairs of fences 68 and 70, respectively, mounted on the airfoil 50 confine the flow of heated gases to respective opposing sides of the aircraft in take-off, landing and level flight action. Forward movement for level flight is achieved by directing a portion of the exhaust gases to flow rearwardly out of the engine exhaust ducts. Substantially conventional controls 72, attached to the aircraft, control its attitude during flight.

Referring now to FIGS. 8 and 9, a modified form of the generally circular aircraft is illustrated wherein the convex vortex generating surfaces 52 are omitted and struts or legs 74 support the aircraft while on the surface of the earth. In this embodiment the upper limit of the airfoil, in that area between the pairs of guide fences 68 and 70, is provided with a plurality of conventional flaps 76, controlled by the operator, which may be actuated during operation of the aircraft to deflect the mass of the stream of gases over the airfoil surface thus increasing or decreasing the lift force.

I claim:

1. In an aircraft having a source of heated fluid, a housing surrounding said source and having an exhaust duct, the improvement comprising: directional control means for fluid flow over an airfoil assembly, said means including a generally circular airfoil having a central recess defined by an upper generally circular surface, in cross section, lying in a plane above the upper limit of said housing and merging with a substantially semi-elliptical vertically disposed depending outer wall surface, said airfoil being connected with and projecting laterally of said housing, conduit means including a conduit extending between said exhaust duct and the central lowermost limit of the recess in said airfoil and forming a distribution chamber concentric with the airfoil, and a discharge nozzle connected with the end of said conduit opposite said exhaust duct for radially directing the stream of heated fluid against the surface forming the recess of said airfoil below its uppermost limit.

2. Structure as specified in claim 1 in which said source of heated fluid comprises a jet engine; and in which one said airfoil is connected with each respective lateral rearward side portion of the housing of said engine.

3. Structure as specified in claim 1 and upstanding guide fences mounted on the upper and outer surfaces of said airfoil for limiting the spreading the stream of heated fluid transversely of its direction of flow.

References Cited

UNITED STATES PATENTS

| | | | |
|---|---|---|---|
| 2,927,746 | 3/1960 | Mellen | 244—12 |
| 2,997,254 | 8/1961 | Mulgrave et al. | 244—12 |
| 3,045,948 | 7/1962 | Howie | 244—12 |
| 3,051,415 | 8/1962 | Frost et al. | 244—23 |
| 3,012,738 | 12/1961 | Bertin et al. | 244—12 |
| 3,065,935 | 11/1962 | Dubbury et al. | 244—23 |

FOREIGN PATENTS 1,281,518  12/1961  France.

MILTON BUCHLER, Primary Examiner

JEFFREY L. FORMAN, Assistant Examiner

U.S. Cl. X.R.

180—116; 244—12, 42, 53